United States Patent
Kodama (10) Patent No.: US 11,584,170 B2
(45) Date of Patent: Feb. 21, 2023

(54) PNEUMATIC TIRE (71) Applicant: Toyo Tire Corporation, Itami (JP)

(72) Inventor: Norihiko Kodama, Itami (JP)

(73) Assignee: TOYO TIRE CORPORATION, Itami (JP)

(*) Notice: Subject to any disclaimer, the term of this patent is extended or adjusted under 35 U.S.C. 154(b) by 219 days.

(21) Appl. No.: 17/109,799

(22) Filed: Dec. 2, 2020

(65) Prior Publication Data

US 2021/0170798 A1 Jun. 10, 2021

(30) Foreign Application Priority Data

Dec. 6, 2019 (JP) .............................. JP2019-221437

(51) Int. Cl.
B60C 13/02 (2006.01)
B60C 11/01 (2006.01)
B60C 11/03 (2006.01)

(52) U.S. Cl.
CPC ........ B60C 13/02 (2013.01); *B60C 2011/013* (2013.01); *B60C 2011/0355* (2013.01)

(58) Field of Classification Search
CPC . B60C 2011/013; B60C 11/01; B60C 13/001; B60C 13/02; B60C 13/04; B60C 2013/045
See application file for complete search history.

(56) References Cited

U.S. PATENT DOCUMENTS

| | | | | |
|---|---|---|---|---|
| 2010/0006196 A1* | 1/2010 | Abe | .................... | B60C 11/01 152/209.16 |
| 2012/0060994 A1* | 3/2012 | Hayashi | ................. | B60C 13/02 152/523 |
| 2015/0367685 A1* | 12/2015 | Takahashi | ............... | B60C 13/00 152/525 |
| 2020/0353777 A1* | 11/2020 | Nakasato | ................ | B60C 11/01 |

FOREIGN PATENT DOCUMENTS

| | | | |
|---|---|---|---|
| JP | 2003320818 A | * | 11/2003 |
| JP | 2016112980 A | * | 6/2016 |
| JP | 2017-136936 A | | 8/2017 |

OTHER PUBLICATIONS

JP 2003-320818 Machine Translation; Hiro, Masataka (Year: 2003).*
JP 2016-112980 Machine Translation; Izumihara, Yuji (Year: 2016).*

* cited by examiner

Primary Examiner — Robert C Dye
Assistant Examiner — Nicholas J Weiler
(74) Attorney, Agent, or Firm — WHDA, LLP (57) ABSTRACT

A pneumatic tire includes a tread portion 16, a sidewall portion 14, a buttress portion 18, and a hollow portion 50. A cross-sectional shape of a bottom surface of the hollow portion 50 is a curved shape in which a plurality of arcs having different radii of curvature are disposed in a tire radial direction and adjacent arcs are connected at a contact point C where the adjacent arcs have a common tangent line, or is a shape in which a plurality of arcs having different radii of curvature are connected by a straight line connecting (Continued)

contact points where the adjacent arcs have a common tangent line. An outside end 32*a*, in the tire radial direction, of a sidewall rubber 32 provided on the sidewall portion 14 is located on an outside Ro in the tire radial direction from the groove bottom 36B1 of the shoulder main groove 36B.

6 Claims, 4 Drawing Sheets

PNEUMATIC TIRE

BACKGROUND OF THE INVENTION

Field of the Invention

The present invention relates to a pneumatic tire.

Background Art

In a pneumatic tire, a ground contact pressure is usually high in the vicinity of a ground contact end of a tread portion during traveling, so that uneven wear, which means that an amount of wear in the vicinity of the ground contact end is larger than those in other portions, may become a problem. In order to suppress such uneven wear, it is known that an annular recess groove extending in a tire circumferential direction is provided in a buttress portion provided between the tread portion and a sidewall portion (for example, Japanese Unexamined Patent Publication No. 2017-136936). In a pneumatic tire provided with an annular recess portion in the buttress portion, the rigidity in the vicinity of the ground contact end of the tread portion can be decreased to reduce the ground contact pressure and the occurrence of uneven wear can be suppressed.

SUMMARY OF THE INVENTION

However, in a pneumatic tire having an annular recess portion in the buttress portion, if the annular recess portion is provided at a position away from the ground contact end of the tread portion inwardly in a radial direction, the rigidity in the vicinity of the ground contact end cannot be sufficiently reduced and uneven wear cannot be suppressed.

In order to suppress the uneven wear, it is conceivable to provide an annular recess portion close to the ground contact end of the tread portion. However, in that case, cracks are likely to occur in rubber starting from the outside end portion, in the tire radial direction, of the sidewall rubber provided on the sidewall portion.

That is, if the annular recess portion is provided close to the ground contact end of the tread portion, the annular recess portion is close to the outside end portion, in the tire radial direction, of the sidewall rubber provided on the sidewall portion. In a pneumatic tire having an annular recess portion in the buttress portion, a strain generated by a load received in the vicinity of the ground contact end of the tread portion tends to concentrate in the annular recess groove. As a result, cracks are likely to occur at the end portion of the sidewall rubber close to the annular recess portion under the influence of the strain stress concentrated in the annular recess groove.

In view of the above points, an object of an embodiment of the present invention is to provide a pneumatic tire in which cracks can be suppressed in the sidewall rubber provided in the sidewall portion while reducing the rigidity in the vicinity of the ground contact end of the tread portion to suppress the occurrence of uneven wear.

According to an embodiment of the present invention, there is provided a pneumatic tire including: a tread portion; a sidewall portion; a buttress portion provided between the tread portion and the sidewall portion; a hollow portion provided on the buttress portion in a tire circumferential direction; and a shoulder main groove provided in the tire circumferential direction on an outside of the tread portion in a tire width direction. A cross-sectional shape of a bottom surface of the hollow portion is a curved shape in which a plurality of arcs having different radii of curvature are disposed side by side in a tire radial direction and adjacent arcs are connected at a contact point where the adjacent arcs have a common tangent line, or a shape in which a plurality of arcs having different radii of curvature are connected by a straight line connecting contact points where the adjacent arcs have a common tangent line. The contact point is located on an inside in the tire radial direction from a groove bottom of the shoulder main groove. An outside end, in the tire radial direction, of a sidewall rubber provided on the sidewall portion is located on the outside in the tire radial direction from the groove bottom of the shoulder main groove.

DETAILED DESCRIPTION OF THE INVENTION

Unless otherwise specified, each dimension described above in the present specification is provided in a regular state with no load in which a pneumatic tire is mounted on a regular rim and filled with a regular internal pressure. Further, in the present specification, a ground contact end E is an end portion, in a tire width direction, of a tread surface that is in contact with a ground of a road surface, in a regular load state where a pneumatic tire is rim-assembled on a regular rim and is vertically placed on a flat road surface in a state of being filled with a regular internal pressure, and a regular load is applied.

The regular rim is an application rim defined for each tire by a standard in a market standard where the tire is used. For example, if it is JATMA, the regular rim is an application rim, if it is TRA, the regular rim is "Approved Rim Contours", and if it is ETRTO, the regular rim is "Approved Rim". The regular internal pressure is an air pressure defined for each tire by each standard in the market where the tire is used. If it is JATMA, the regular internal pressure is an air pressure corresponding to a maximum load capacity of a target tire, and if it is TRA, the regular internal pressure is an air pressure corresponding to a maximum load capacity of a target tire described in a table of "TIRE LOAD LIMITS AT VARIOUS COLD INFLATION PRESSURES", and if it is ETRTO, the regular internal pressure corresponds to "INFLATION PRESSURE". For example, in a case where a tire having a tire size of 295/75R22.5 (LR=G), it may be set to 760 kPa. In addition, the regular load is a permissible load defined for each tire by each standard in the market where the tire is used. If it is JATMA, the regular load is a single wheel maximum load capacity value of the target tire, if it is TRA, the regular load is a single wheel maximum load capacity value of the target tire described in the table described above, and if it is ETRTO, the regular load is a single wheel "LOAD CAPACITY PER AXLE" value of the target tire.

First Embodiment

A pneumatic tire 10 of a first embodiment of the present invention will be described with reference to the drawings.

Figure 1:
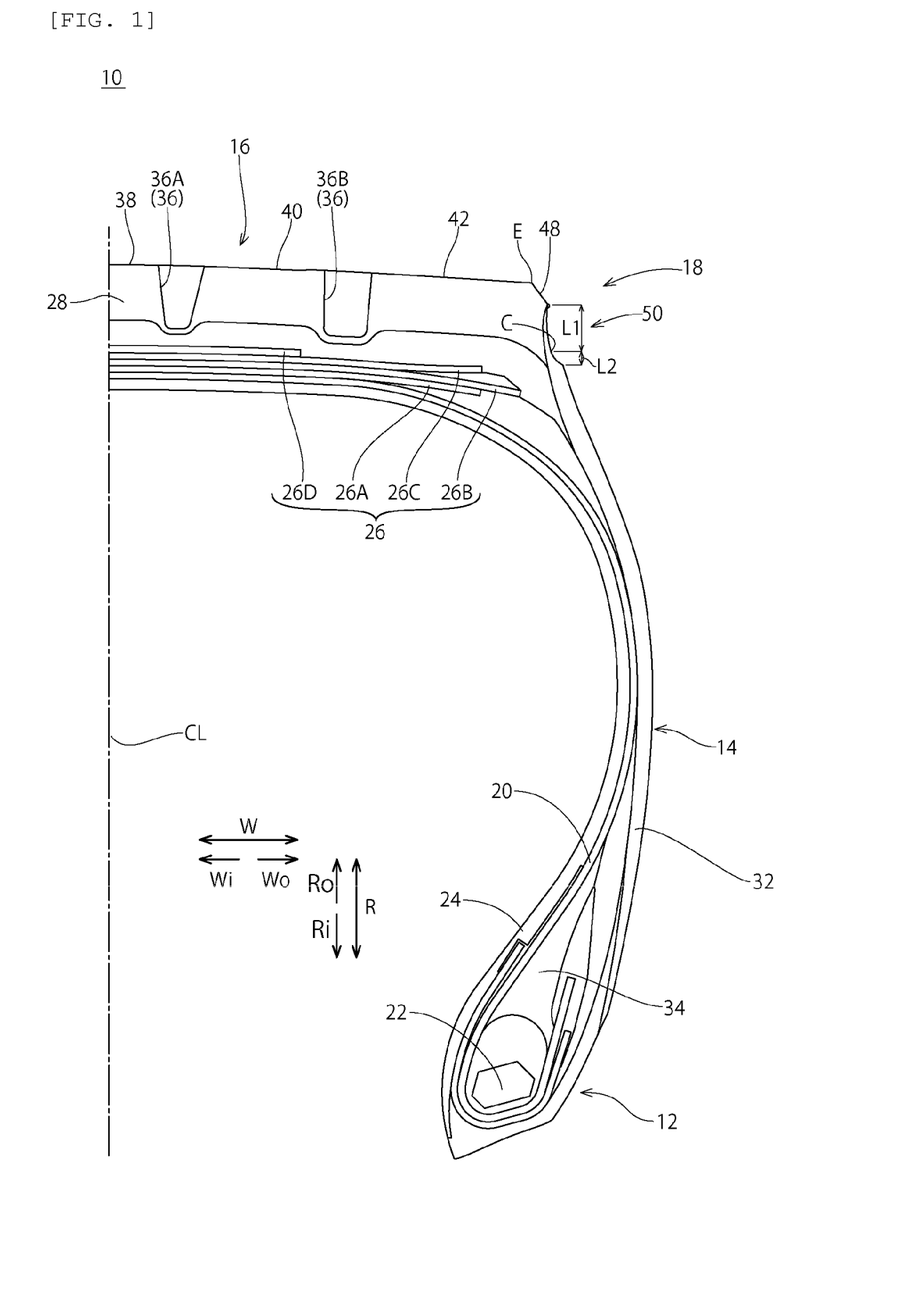
FIG. 1 is a half sectional view of a pneumatic tire according to a first embodiment of the present invention.

FIG. 1 is a sectional view of a tire meridian illustrating an example of the pneumatic tire 10 according to the present embodiment. Since the pneumatic tire 10 is left-right symmetrical, only a right half is illustrated in the drawing.

The pneumatic tire 10 of FIG. 1 includes a pair of left and right bead portions 12, a pair of left and right sidewall portions 14 extending outside in a radial direction from the bead portions 12, a tread portion 16 forming a tread surface, and a pair of left and right buttress portions 18 disposed on an inside Ri of the tread portion 16 in the tire radial direction. Here, the buttress portion 18 is a boundary region between the tread portion 16 and the sidewall portion 14, and is provided so as to connect between the tread portion 16 and the sidewall portion 14.

The pneumatic tire 10 includes a carcass ply 20 provided so as to be bridged between the pair of bead portions 12 in a toroidal shape. A ring-shaped bead core 22 is embedded in each of the pair of bead portions 12. A bead filler 34 made of a hard rubber material that tapers outward in the tire radial direction is disposed on an outer peripheral side of the bead core 22.

The carcass ply 20 extend from the tread port ion 16 through the buttress portion 18 and the sidewall portion 14 and is locked by the bead core 22 at the bead portion 12. The carcass ply 20 reinforces the bead portion 12, the sidewall portion 14, the tread portion 16, and the buttress portion 18. In this example, the carcass ply 20 is locked at both ends by each being folded around the bead core 22 from an inside Wi to an outside Wo in a tire width direction. An inner liner 24 for holding an air pressure is disposed inside the carcass ply 20.

The carcass ply 20 is formed of at least one ply coated with topping rubber in which a metal cord such as a steel cord and an organic fiber cord such as polyester fiber, rayon fiber, aramid fiber, and nylon fiber are disposed at a predetermined angle (for example, 70° to 90°) with respect to the tire circumferential direction. The carcass ply 20 in this example is configured of one ply. As the cord constituting the carcass ply 20, for example, the metal cord such as the steel cord is preferably used.

A belt 26 is disposed on an outer peripheral side of the carcass ply 20 in the tread portion 16. That is, the belt 26 is provided between the carcass ply 20 and a tread rubber 28 in the treadportion 16. The belt 26 is configured of a plurality of crossed belt plies in which belt cords are disposed at a predetermined angle (for example, 10° to 75°) with respect to the tire circumferential direction. As the belt cord, a steel cord or an organic fiber cord having high tension is used.

In this example, the belt 26 has a four-layer structure of a first belt 26A located closest to the inside Ri in the tire radial direction, a second belt 26B and a third belt 26C stacked in order on the outer peripheral side thereof, and a fourth belt 26D located closest to an outside Ro in the tire radial direction. The second belt 26B is a maximum width belt having a widest width among the four-layers of the belts 26A, 26B, 26C, and 26D.

A plurality of main grooves 36 extending in a tire circumferential direction S are provided on a surface of the tread portion 16. Specifically, the main groove 36 is configured of a pair of shoulder main grooves 36B provided at positions close to a ground contact end E of the tread portion 16 and a pair of center main grooves 36A provided between the pair of shoulder main grooves 36B. The outside Wo in the tire width direction refers to a side away from a tire equatorial plane CL in the tire width direction W.

Due to the four main grooves 36 described above, in the tread portion 16, a central land portion 38 is formed between the two center main grooves 36A, an intermediate land portion 40 is formed between the center main groove 36A and the shoulder main groove 36B, and a shoulder land portion 42 is formed on the outside Wo of the two shoulder main grooves 36B in the tire width direction.

In this example, the central land portion 38, the intermediate land portion 40, and the shoulder land portion 42 are configured of ribs continuous in the tire circumferential direction. The central land portion 38, the intermediate land portion 40, and the shoulder land portion 42 may be block columns divided in the tire circumferential direction by lateral grooves.

An outside end of the tread surface of the shoulder land portion 42 in the tire width direction forms the ground contact end E. The buttress portion 18 extending to the inside Ri in the tire radial direction and forming an upper portion of the side surface of the tire is connected to the ground contact end E.

Figure 2:
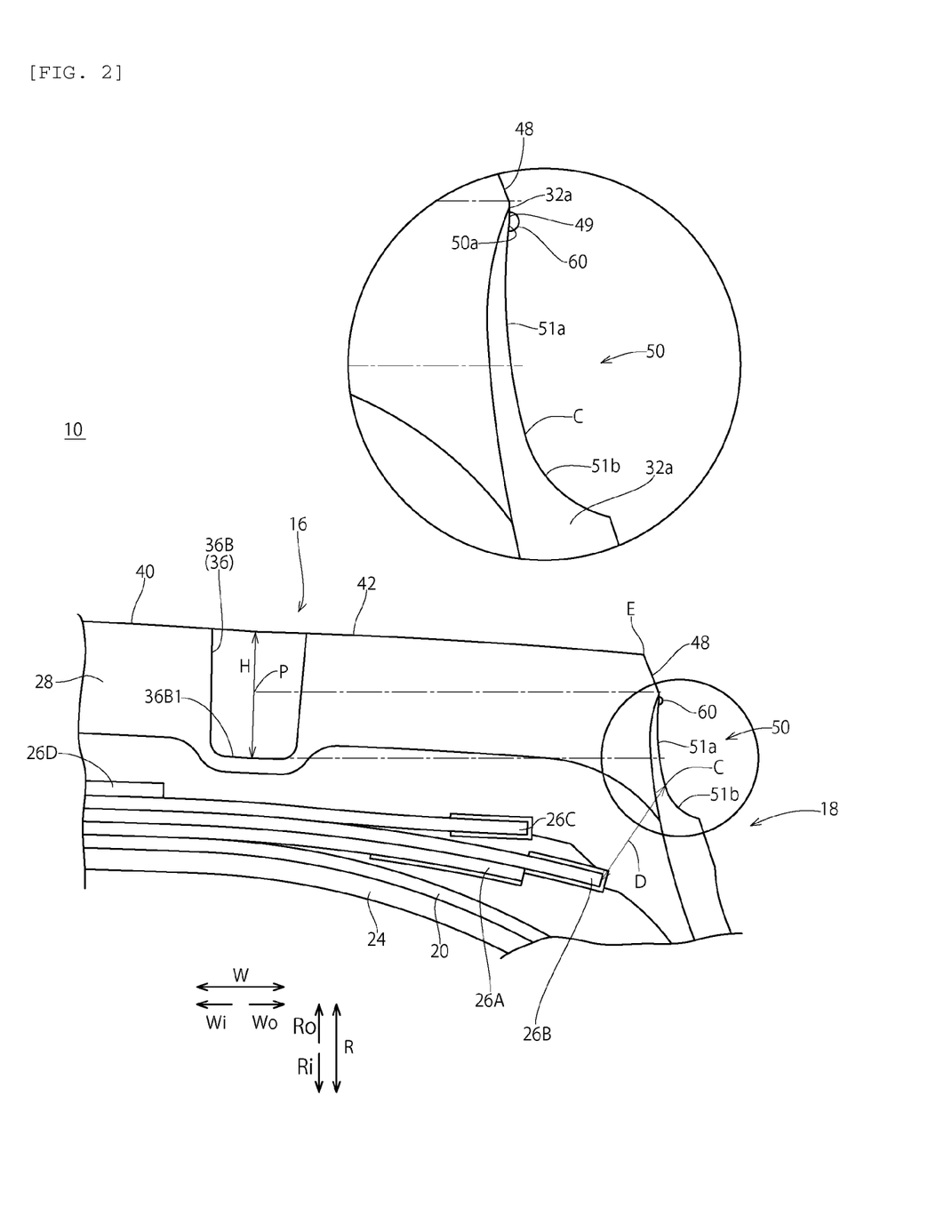
FIG. 2 is an enlarged view of a main portion of FIG. 1.

Then, as illustrated in FIGS. 1 and 2, an outer surface of the buttress portion 18 is formed of an inclined portion 48 extending from the ground contact end E toward the inside Ri in the tire radial direction and a hollow portion 50 provided on the inside Ri in the tire radial direction from the inclined portion 48.

The inclined portion 48 is inclined so as to expand in the tire width direction W from the ground contact end E toward the inside Ri in the tire radial direction (that is, to reduce a diameter toward the outside Wo in the tire width direction). The inclined portion 48 weakens the rigidity of the shoulder land portion 42 on a ground contact end E side and improves a wandering performance when climbing over a step on the road surface such as a rut.

In the present embodiment, as illustrated in FIG. 2, a bent portion 49 bent to the inside Ri in the tire radial direction is provided on a tip side (outside in the tire width direction) of the inclined portion 48, and an outside end 50a of the hollow portion 50 in the tire width direction is connected to the tip of the bent portion 49.

The hollow portion 50 is an annular recess groove extending in the tire circumferential direction, which sinks from the outer surface of the buttress portion 18 to the inside Wi in the tire width direction. A cross-sectional shape of a bottom surface of the hollow portion 50 is a curved shape in which two arcs having different radii of curvature are disposed side by side in the tire radial direction, and adjacent arcs are connected at a contact point C where the adjacent arcs have a common tangent line.

Specifically, the bottom surface of the hollow portion 50 is formed of an upper arc portion 51a provided on the outside Ro in the tire radial direction and a lower arc portion 51b provided on the inside Ri of the upper arc portion 51a in the tire radial direction. The upper arc portion 51a is a curved surface having a cross section formed of an arc having a radius of curvature ra, and the lower arc portion 51b is a curved surface having a cross section formed of an arc having a radius of curvature rb which is smaller than the radius of curvature ra. A length L1 of the upper arc portion 51a in the tire radial direction R is longer than a length L2 of the lower arc portion 51b in the tire radial direction R. As an example, the radius of curvature ra of the upper arc portion 51a may be set to 10 to 40 mm, the radius of curvature rb of the lower arc portion 51b may be set to 3 to 15 mm, the length L1 of the upper arc portion 51a in the tire radial direction R may be set to 5 to 14 mm, and the length L2 of the lower arc portion 51b in the tire radial direction R may be set to 2 to 9 mm.

As described above, the upper arc portion 51a and the lower arc portion 51b forming the bottom surface of the hollow portion 50 are connected so as to have the common tangent line at the contact point C, and are smoothly connected at the contact point C without any ridge protruding from the bottom surface of the hollow portion 50 to the outside Wo in the tire width direction.

The hollow portion 50 is disposed in the buttress portion 18 so that the contact point C between the upper arc portion 51a and the lower arc portion 51b is located on the inside Ri in the tire radial direction from a groove bottom 36B1 of the shoulder main groove 36B.

A protrusion portion 60 extending in the tire circumferential direction is provided at the outside end 50a of the hollow portion 50 in the tire radial direction. The protrusion portion 60 is provided so as to straddle the hollow portion 50 and the bent portion 49. The protrusion portion 60 is a protrusion formed by a narrow groove called a saw cut provided in a tire mold. As an example, a length (width of the protrusion portion 60) of the protrusion portion 60 in the tire radial direction R may be set to 0.50 to 1.50 mm, and a height of the protrusion portion 60 may be set to 0.50 to 1.50 mm. The protrusion portion 60 may be an annular protrusion continuously extending in the tire circumferential direction, or may be a protrusion intermittently extending in the tire circumferential direction. In a case where the protrusion portions 60 intermittently extends in the tire circumferential direction, a distance between the protrusion portions 60 adjacent to each other in the tire circumferential direction may be set to 8 to 50 mm.

It is desirable that the hollow portion 50 is provided such that a distance in the tire radial direction R from the ground contact end E of the tread portion 16 to the contact point C is 30 mm or less. Further, it is desirable that a distance D from an end 26B1 of the widest second belt 26B to the contact point C in the tire width direction is 12 mm or more.

A sidewall rubber 32 is provided on the outside (that is, on the tire outer surface side) of the carcass ply 20 in the sidewall portion 14. The sidewall rubber 32 is a rubber member that constitutes the surface (outer surface) of the sidewall portion 14, and is formed of a rubber composition having a high cut resistance and weather resistance for sidewall formulation.

The sidewall rubber 32 extends from the outside Wo of the bead filler 34 of the bead portion 12 in the tire width direction to the outside Ro in the tire radial direction along the outer surface of the tire. An outside end 32a of the sidewall rubber 32 in the tire radial direction is located on the outside Ro in the tire radial direction from the groove bottom 36B1 of the shoulder main groove 36B. That is, the outside end 32a of the sidewall rubber 32 in the tire radial direction is located on the outside Ro in the tire radial direction from the contact point C of the hollow portion 50.

It is desirable that the outside end 32a of the sidewall rubber 32 in the tire radial direction is located at a position of 50% or less of a groove depth H from the groove bottom 36B1 of the shoulder main groove 36B. That is, it is desirable that the outside end 32a of the sidewall rubber 32 in the tire radial direction is at the same position in the tire radial direction R as a position P of 50% of the groove depth H from the groove bottom 36B1 of the shoulder main groove 36B, or located on the inside Ri in the tire radial direction from the position P. Further, it is desirable that the outside end 32a of the sidewall rubber 32 in the tire radial direction is separated from the contact point C between the upper arc portion 51a and the lower arc portion 51b by 4 mm or more on the outside Ro in the tire radial direction.

In the pneumatic tire 10 of the present embodiment as described above, the contact point C between the upper arc portion 51a and the lower arc portion 51b is disposed on the inside Ri in the tire radial direction from the groove bottom 36B1 of the shoulder main groove 36B, and the outside end 32a of the sidewall rubber 32 in the tire radial direction is disposed on the outside Ro in the tire radial direction from the groove bottom 36B1 of the shoulder main groove 36B.

Therefore, the outside end 32a of the sidewall rubber 32 in the tire radial direction can be disposed in the vicinity of the ground contact end E of the tread portion 16 to improve the cut resistance and weather resistance in the buttress portion 18, and improve a rough road running performance and durability.

Moreover, the outside end 32a of the sidewall rubber 32 in the tire radial direction is disposed so as to avoid the contact point C of the hollow portion 50 where strain tends to concentrate when the tire is in contact with the ground. Therefore, it is possible to suppress cracks in the sidewall rubber 32 starting from the outside end 32a of the sidewall rubber 32 in the tire radial direction, while suppressing uneven wear in the vicinity of the ground contact end of the tread portion by the hollow portion 50.

Further, in the present embodiment, if the outside end 32a of the sidewall rubber 32 in the tire radial direction is located at a position of 50% or less of the groove depth from the groove bottom of the shoulder main groove, since the sidewall rubber 32 is not exposed on the outer surface of the tread portion 16 until an end stage of wear, different rubber is not disposed on the outer surface of the tread portion 16 from an early stage to a middle stage of wear, and a desired tire performance can be maintained.

Further, in the present embodiment, if the distance D from the end 26B1 of the widest second belt 26B in the tire width direction to the contact point C is 12 mm or more, the rubber thickness is sufficiently ensured from the end portion of the belt 26 to the bottom surface of the hollow portion 50, and separation that the tread rubber peels off from the end portion of the belt 26 is less likely to occur.

Further, in the present embodiment, if the narrow protrusion portion 60 is provided at the outside end 50a of the hollow portion 50 in the tire radial direction, the narrow groove is provided at an outside end of a protruded hollow forming portion in the tire radial direction, which forms the hollow portion 50 in a tire mold for vulcanization molding of the pneumatic tire 10, and a rubber flow in the vicinity of the hollow forming portion is improved, and a vulcanization molding defect such as bare (recess on the tire surface) can be suppressed.

Further, in the present embodiment, in a case where the radius of curvature R1 of the upper arc portion 51a provided on the outside Ro of the hollow portion 50 in the tire radial direction is larger than the radius of curvature R2 of the lower arc portion 51b provided on the inside Ri of the hollow portion 50 in the tire radial direction, and the length L1 of the upper arc portion 51a in the tire radial direction R is longer than the length L2 of the lower arc portion 51b in the tire radial direction R, the following effects are obtained.

That is, in order to reduce the ground contact pressure in the vicinity of the ground contact end of the tread portion, even if the hollow portion 50 is disposed close to the ground contact end E of the tread portion 16, the contact point C of the hollow portion 50 can be disposed on the inside Ri in the tire radial direction. Therefore, the outside end 32a of the sidewall rubber 32 in the tire radial direction can be disposed at a position away from the contact point C of the hollow portion 50 where strain is likely to be concentrated, and uneven wear and the separation of the sidewall rubber 32 can be compatible at a high level.

Second Embodiment

Next, a pneumatic tire 100 of a second embodiment of the present invention will be described focusing on portions different from those of the first embodiment based on FIG. 3. The same components as those of the first embodiment are designated by the same reference numerals, and detailed description thereof will be omitted.

In the first embodiment described above, a case where the cross-sectional shape of the bottom surface of the hollow portion 50 has the curved shape in which two arcs having different radii of curvature are connected at the contact point C where the adjacent arcs have the common tangent line is described.

Figure 3:
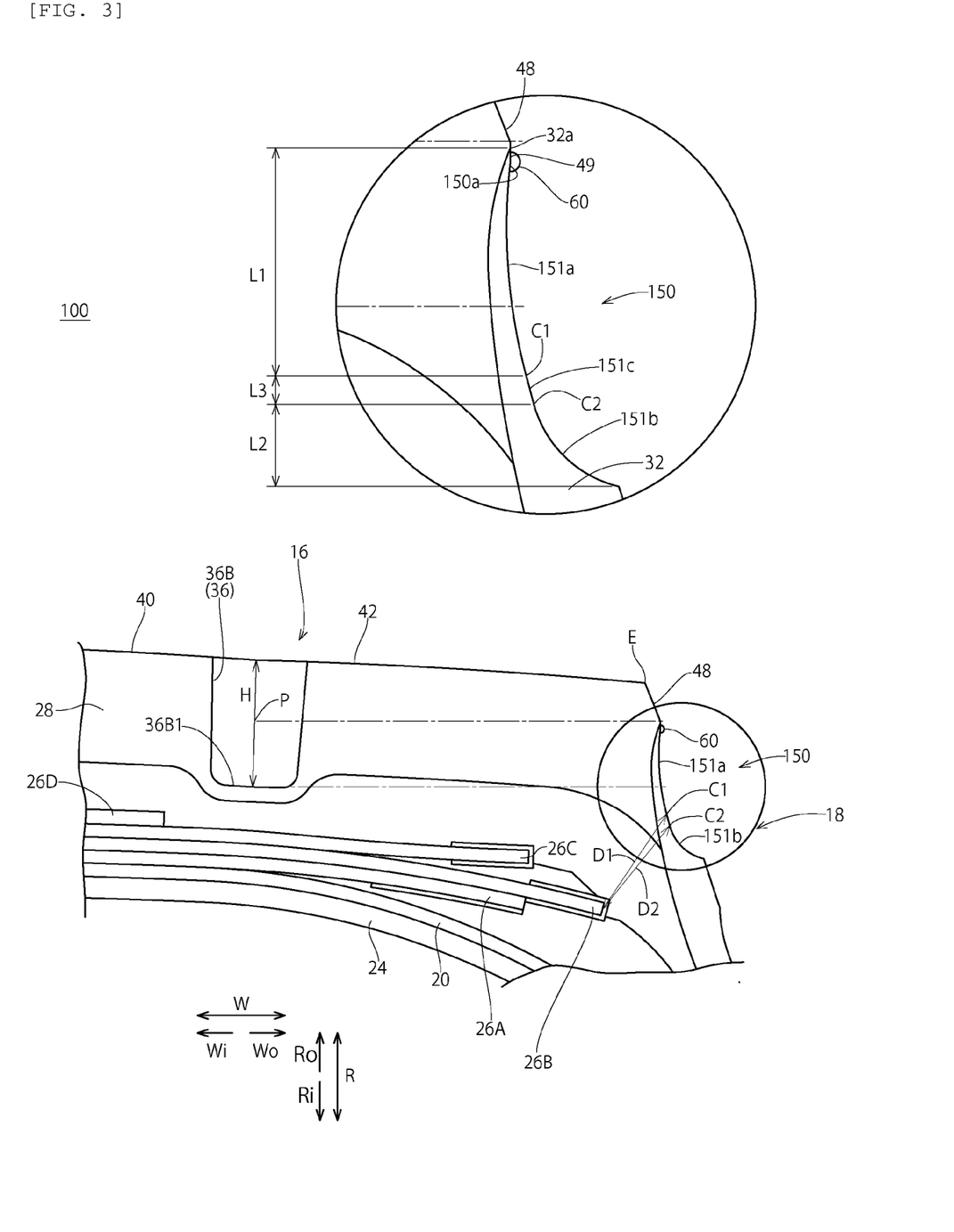
FIG. 3 is an enlarged sectional view illustrating a main portion of a pneumatic tire according to a second embodiment of the present invention.

In the present embodiment, as illustrated in FIG. 3, a cross-sectional shape of a bottom surface of a hollow portion 150 has a shape in which three arcs having different radii of curvature are disposed side by side in the tire radial direction and the adjacent arcs are connected by contact points C1 and C2 where the adjacent arcs have a common tangent line.

Specifically, the bottom surface of the hollow portion 150 includes an upper arc portion 151a provided closest to the outside Ro in the tire radial direction, a lower arc portion 151b provided closest to the inside Ri in the tire radial direction, and an intermediate arc portion 151c provided between the upper arc portion 151a and the lower arc portion 151b. The upper arc portion 151a is a curved surface having a cross section formed of an arc having a radius of curvature ra, and the lower arc portion 151b is a curved surface having a cross section formed of an arc having a radius of curvature rb which is smaller than the radius of curvature ra. The intermediate arc portion 151c is a curved surface having a cross section formed an arc having a radius of curvature rc which is larger than the radius of curvature ra and the radius of curvature rb. The length L1 of the upper arc portion 151a in the tire radial direction R is longer than those of the lower arc portion 151b and the intermediate arc portion 151c.

The upper arc port ion 151a and the intermediate arc portion 151c are connected so as to have a common tangent line at the contact point C1. The intermediate arc portion 151c and the lower arc portion 151b are connected so as to have a common tangent line at the contact point C2. Therefore, the upper arc portion 151a, the intermediate arc portion 151c, and the lower arc portion 151b are smoothly connected to each other at the contact points C1 and C2 without causing ridges.

As an example, the radius of curvature ra of the upper arc portion 151a may be set to 10 to 40 mm, the radius of curvature rb of the lower arc portion 151b may be set to 3 to 15 mm, the radius of curvature rc of the intermediate arc portion 151c may be set to 100 to 250 mm, the length L1 of the upper arc portion 151a in the tire radial direction R may be set to 5 to 14 mm, the length L2 of the lower arc portion 151b in the tire radial direction R may be set to 2 to 9 mm, and the length L3 of the intermediate arc portion 151c in the tire radial direction R may be set to 1 to 4 mm.

In the hollow portion 150, the contact point C1 between the upper arc portion 151a and the intermediate arc portion 151c, and the contact point C2 between the intermediate arc portion 151c and the lower arc portion 151b are disposed in the buttress portion 18 so as to be located on the inside Ri in the tire radial direction from the groove bottom 36B1 of the shoulder main groove 36B. In other words, the hollow portion 150 is disposed in the buttress portion 18 such that both the contact points C1 and C2 are located on the inside Ri in the tire radial direction from the groove bottom 36B1 of the shoulder main groove 36B.

It is desirable that the hollow portion 150 is provided such that a distance in the tire radial direction R from the ground contact end E of the tread portion 16 to the contact point C1 of the upper arc portion 151a is 30 mm or less. Further, it is desirable that a distance D1 from the end 26B1 of the widest second belt 26B in the tire width direction to the contact point C1 and a distance D2 to the contact point C2 are 12 mm or more.

Similar to the first embodiment, it is desirable that the outside end 32a of the sidewall rubber 32 in the tire radial direction is located at a position of 50% or less of the groove depth H from the groove bottom 36B1 of the shoulder main groove 36B. Further, it is desirable that the outside end 32a of the sidewall rubber 32 in the tire radial direction is separated from the contact point C2 of the lower arc portion 151b by 4 mm or more on the outside Ro in the tire radial direction.

Even with the pneumatic tire 100 of the present embodiment as described above, the same effects as those of the first embodiment described above can be achieved.

Third Embodiment

Figure 4:
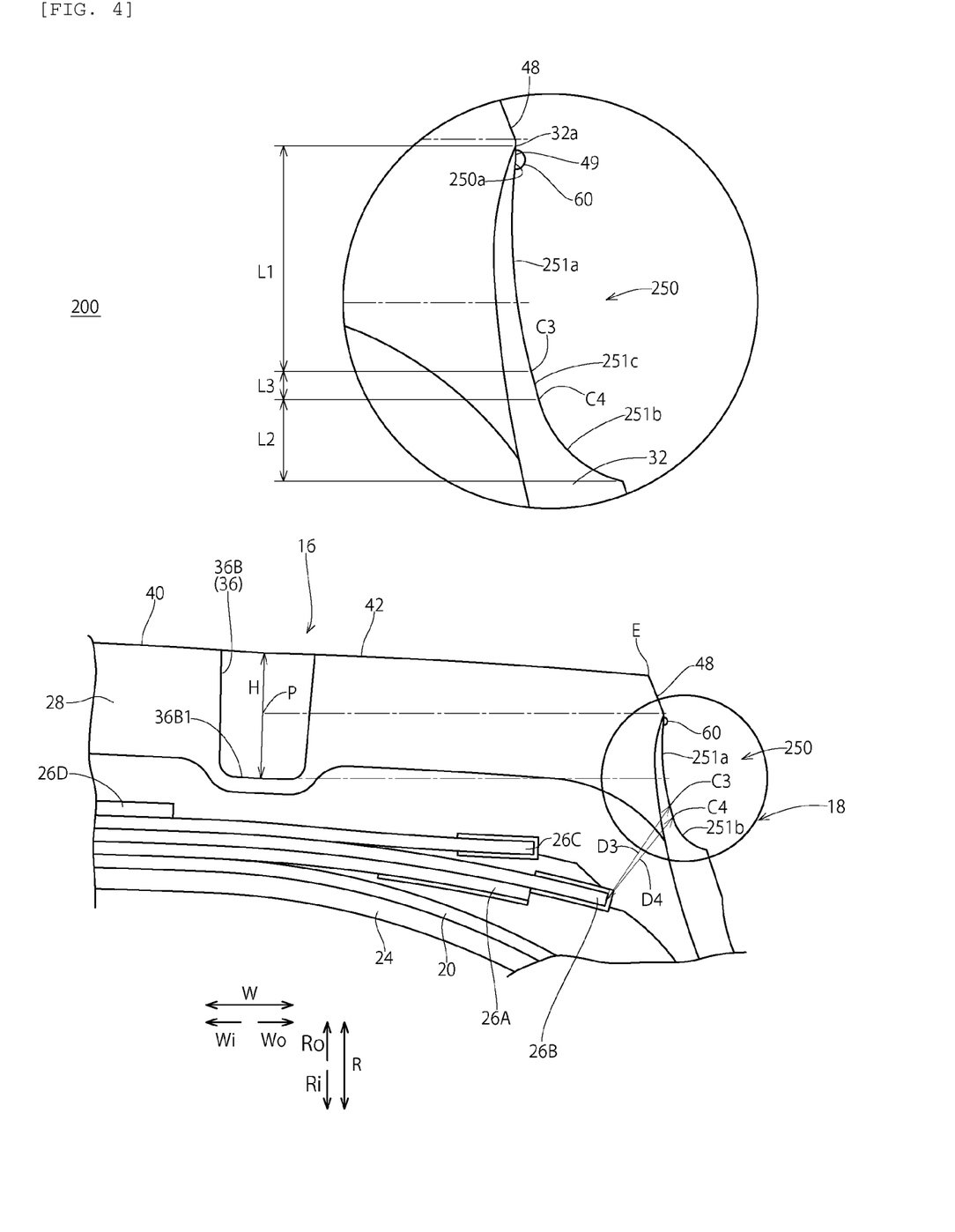
FIG. 4 is an enlarged sectional view illustrating a main portion of a pneumatic tire according to a third embodiment of the present invention.

Next, a pneumatic tire 200 of a third embodiment of the present invention will be described focusing on portions different from those of the first embodiment based on FIG. 4. The same components as those of the first embodiment are designated by the same reference numerals, and detailed description thereof will be omitted.

In the first embodiment described above, a case where the cross-sectional shape of the bottom surface of the hollow portion 50 has a curved shape in which two arcs having different radii of curvature are connected at the contact point C where the adjacent arcs have the common tangent line is described. In the present embodiment, as illustrated in FIG. 4, a cross-sectional shape of a bottom surface of a hollow portion 250 has a shape in which two arcs having different radii of curvature are connected by a straight line connecting contact points C3 and C4 where the adjacent arcs have a common tangent line.

Specifically, the bottom surface of the hollow portion 250 includes an upper arc portion 251a provided on the outside Ro in the tire radial direction, a lower arc portion 251b provided on the inside Ri of the upper arc portion 251a in the tire radial direction, and a straight line portion 251c that connects the upper arc portion 251a and the lower arc portion 251b. The upper arc portion 251a is a curved surface having a cross section formed of an arc having a radius of curvature ra, and the lower arc portion 251b is a curved surface having a cross section formed of an arc having a radius of curvature rb which is smaller than the radius of curvature ra.

Since the tangent line of the upper arc portion 251a at the contact point C3 is common to, that is, coincides with the tangent line of the lower arc portion 251b at the contact point C4, the straight line portion 251c connecting the contact point C3 and the contact point C4 coincides with the tangent line of the upper arc portion 251a at the contact point C3, and also coincides with the tangent line of the lower arc portion 251b at the contact point C4. Therefore, the upper arc portion 251a and the lower arc portion 251b are smoothly connected to each other via the straight line portion 251c without causing ridges at the contact points C3 and C4.

As an example, the radius of curvature ra of the upper arc portion 251a may be set to 10 to 40 mm, the radius of curvature rb of the lower arc portion 251b may be set to 3 to 15 mm, the length L1 of the upper arc portion 251a in the tire radial direction R may be set to 5 to 14 mm, the length L2 of the lower arc portion 251b in the tire radial direction R may be set to 2 to 9 mm, and the length L3 of the straight line portion 251c in the tire radial direction R may be set to 1 to 4 mm.

The hollow portion 250 is disposed in the buttress portion 18 such that the contact point C3 of the upper arc portion 251a and the contact point C4 of the lower arc portion 251b are located on the inside Ri in the tire radial direction from the groove bottom 36B1 of the shoulder main groove 36B. In other words, the hollow portion 250 is disposed in the buttress portion 18 such that the straight line portion 251c is located on the inside Ri in the tire radial direction from the groove bottom 36B1 of the shoulder main groove 36B.

It is desirable that the hollow portion 250 is provided such that a distance in the tire radial direction R from the ground contact end E of the tread portion 16 to the contact point C3 of the upper arc portion 251a is 30 mm or less. Further, it is desirable that a distance D3 from the end 26B1 of the widest second belt 26B in the tire width direction to the contact point C3 and a distance D4 to the contact point C4 are 12 mm or more.

Similar to the first embodiment, it is desirable that the outside end 32a of the sidewall rubber 32 in the tire radial direction is located at a position of 50% or less of the groove depth H from the groove bottom 36B1 of the shoulder main groove 36B. Further, it is desirable that the outside end 32a of the sidewall rubber 32 in the tire radial direction is separated from the contact point C4 of the lower arc portion 251b by 4 mm or more on the outside Ro in the tire radial direction.

Even with the pneumatic tire 200 of the present embodiment as described above, the same effects as those of the first embodiment described above can be achieved.

MODIFIED EXAMPLES

The embodiments described above are presented as examples and are not intended to limit the scope of the invention. This novel embodiments can be implemented in various other embodiments, and various omissions, replacements, and changes can be made without departing from the gist of the invention.

For example, in the embodiments described above, the case where the hollow port ion 50 forms a completely continuous annular shape in the tire circumferential direction is described, but it may be intermittent at some points in the circumferential direction.

Further, in the first and second embodiments described above, cases where the cross-sectional shapes of the bottom surface of the hollow portion are respectively configured of two and three arcs having different radii of curvature are described, but a curved shape may be employed in which four or more arcs may be disposed side by side in the tire radial direction, and adjacent arcs are connected at a contact point where the adjacent arcs have a common tangent line. Further, in the third embodiment described above, the case where the cross-sectional shape of the bottom surface of the hollow portion has the shape in which two arcs having different radii of curvature are connected by the straight line connecting the contact points where the adjacent arcs have the common tangent line is described. However, it may have a shape in which three or more arcs are provided and adjacent arcs are connected by a straight line connecting the contact points where the adjacent arcs have the common tangent line.

What is claimed is:

1. A pneumatic tire comprising:
   a tread portion;
   a sidewall portion;
   a buttress portion provided between the tread portion and the sidewall portion;
   a hollow portion provided on the buttress portion in a tire circumferential direction; and
   a shoulder main groove provided in the tire circumferential direction on an outside of the tread portion in a tire width direction,
   wherein a cross-sectional shape of a bottom surface of the hollow portion is a shape in which a plurality of arcs having different radii of curvature are disposed
   an outside end, in the tire radial direction, of a sidewall rubber provided on the sidewall portion is located on an outside in the tire radial direction from the groove bottom of the shoulder main groove,
   the arcs include an upper arc provided on the outside in the tire radial direction, a lower arc provided on the inside in the tire radial direction of the upper arc, and a straight line connecting contact points where the upper arc and the lower arc have a common tangent line,
   a cross section of the upper arc includes an arc having a radius of curvature larger than that of the cross section of the lower arc,
   the contact points are located on an inside in the tire radial direction from a groove bottom of the shoulder main groove, and
   a length of the upper arc in the tire radial direction is longer than that of the lower arc.

2. The pneumatic tire according to claim 1,
   wherein the outside end of the sidewall rubber in the tire radial direction is located at a position of 50% or less of a groove depth from the groove bottom of the shoulder main groove.

3. The pneumatic tire according to claim 1,
   wherein the outside end of the sidewall rubber in the tire radial direction is separated from both of the contact points by 4 mm or more in the tire radial direction.

4. The pneumatic tire according to claim 1,
   wherein the tread portion is provided with a belt, and a distance from a belt end in the belt located closest to the outside, in the tire width direction, from a center in the tire width direction to both of the contact points is 12 mm or more.

5. The pneumatic tire according to claim 1,
   wherein a protrusion portion is provided at the outside end of the hollow portion in the tire radial direction.

6. The pneumatic tire according to claim 5,
   wherein the outside end of the sidewall rubber in the tire radial direction is provided on the outside in the tire radial direction from the protrusion portion.

* * * * *